United States Patent
Langston et al.

(10) Patent No.: US 9,481,849 B2
(45) Date of Patent: Nov. 1, 2016

(54) POLYMER USEFUL AS VISCOSITY INDEX IMPROVER

(75) Inventors: Justin August Langston, Kutztown, PA (US); Jen-Lung Wang, Villanova, PA (US); Peter Moore, Glenside, PA (US)

(73) Assignee: Evonik Oil Additives GmbH, Darmstadt (DE)

( * ) Notice: Subject to any disclaimer, the term of this patent is extended or adjusted under 35 U.S.C. 154(b) by 286 days.

(21) Appl. No.: 13/576,098

(22) PCT Filed: Feb. 24, 2011

(86) PCT No.: PCT/EP2011/052710
§ 371 (c)(1),
(2), (4) Date: Jul. 30, 2012

(87) PCT Pub. No.: WO2011/134694
PCT Pub. Date: Nov. 3, 2011

(65) Prior Publication Data
US 2012/0302477 A1    Nov. 29, 2012

Related U.S. Application Data

(60) Provisional application No. 61/327,917, filed on Apr. 26, 2010.

(51) Int. Cl.
*C10M 145/14* (2006.01)
*C08F 222/10* (2006.01)
(Continued)

(52) U.S. Cl.
CPC .......... *C10M 145/14* (2013.01); *C08F 220/18* (2013.01); *C10M 145/16* (2013.01);
(Continued)

(58) Field of Classification Search
CPC .......... C10M 2209/084; C08F 220/18; C08F 222/14
USPC ................................ 508/469; 526/325, 328.5
See application file for complete search history.

(56) References Cited

U.S. PATENT DOCUMENTS 4,822,508 A    4/1989  Pennewiss et al.
4,968,444 A   11/1990  Knoell et al.
(Continued)

FOREIGN PATENT DOCUMENTS

EP   0 140 274    5/1985
EP   0 225 598    6/1987
(Continued)

OTHER PUBLICATIONS

Office Action issued Jan. 17, 2014 in European Patent Application No. 11707141.5.
(Continued)

*Primary Examiner* — Vishal Vasisth
(74) *Attorney, Agent, or Firm* — Oblon, McClelland, Maier & Neustadt, L.L.P.

(57) ABSTRACT

The present invention describes a polymer useful as viscosity index improver comprising units derived from one or more ethylenically unsaturated ester compounds of formula (I), where R is hydrogen or methyl, $R^1$ means a linear, branched or cyclic alkyl residue with 1-6 carbon atoms, $R^2$ and $R^3$ independently represent hydrogen or a group of the formula —COOR', where R' means hydrogen or a alkyl group with 1-6 carbon atoms, units of one or more ethylenically unsaturated ester compounds of formula (II), where R is hydrogen or methyl, $R^4$ means a 2-alkyl branched alkyl residue with 12-18 carbon atoms, $R^5$ and $R^6$ independently are hydrogen or a group of the formula —COOR", where R" means hydrogen or an alkyl group with 12-18 carbon atoms, and units of one or more ethylenically unsaturated ester compounds of formula (III), where R is hydrogen or methyl, $R^7$ means a linear alkyl residue with 12-24 carbon atoms, $R^8$ and $R^9$ independently are hydrogen or a group of the formula —COOR", where R" means hydrogen or an alkyl group with 12-24 carbon atoms wherein said polymer comprises at least 10% by weight units derived from one or more ethylenically unsaturated ester compounds of formula (I), based on the total weight of the polymer, said polymer comprises at least 10% by weight units derived from one or more ethylenically unsaturated ester compounds of formula (II), based on the total weight of the polymer, and said polymer comprises at least 10% by weight units derived from one or more ethylenically unsaturated ester compounds of formula (III), based on the total weight of the polymer.

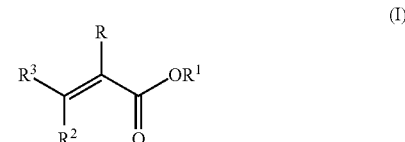

(I)

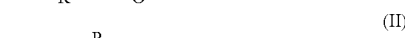

(II)

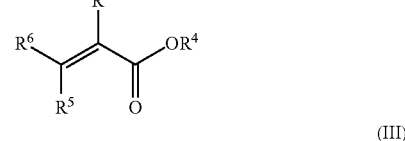

(III)

23 Claims, No Drawings

(51) Int. Cl.
*C08F 220/10* (2006.01)
*C08F 220/18* (2006.01)
*C10M 145/16* (2006.01)

(52) U.S. Cl.
CPC ............. *C10M2203/1025* (2013.01); *C10M 2209/084* (2013.01); *C10M 2209/086* (2013.01); *C10N 2230/02* (2013.01); *C10N 2230/68* (2013.01); *C10N 2240/042* (2013.01); *C10N 2240/045* (2013.01); *C10N 2240/046* (2013.01); *C10N 2270/00* (2013.01)

(56) References Cited

U.S. PATENT DOCUMENTS

| | | | |
|---|---|---|---|
| 5,043,087 | A | 8/1991 | Pennewiss et al. |
| 6,391,996 | B1 | 5/2002 | Scherer et al. |
| 2004/0077509 | A1 | 4/2004 | Yuki et al. |
| 2006/0240999 | A1* | 10/2006 | Placek .............. C10M 145/14 508/469 |
| 2009/0143262 | A1* | 6/2009 | Kawata ..................... 508/256 |
| 2012/0053100 | A1 | 3/2012 | Radano et al. |

FOREIGN PATENT DOCUMENTS

| | | |
|---|---|---|
| EP | 2 009 074 A1 | 12/2008 |
| GB | 2 189 495 | 10/1987 |
| JP | 2003-147332 A | 5/2003 |
| JP | 2003-292938 | 10/2003 |
| JP | 2006-233196 | 9/2006 |
| JP | 2006-233196 A | 9/2006 |
| JP | 2008-24908 | 2/2008 |
| JP | 2008-31459 | 2/2008 |
| JP | 2008-88215 | 4/2008 |
| JP | 2008-88215 A | 4/2008 |
| WO | WO 2012/076285 A1 | 6/2012 |
| WO | WO 2012/076676 A1 | 6/2012 |

OTHER PUBLICATIONS

International Search Report Issued May 18, 2011 in PCT/EP11/52710 filed Feb. 24, 2011.
U.S. Appl. No. 13/636,034, filed Sep. 19, 2012, Ghahary, et al.
Office Action issued Sep. 8, 2014 in Japanese Patent Application No. 2013-506552 with partial English language translation.
First Office Action issued Feb. 24, 2015 in Russian Patent Application No. 2012150069, filed Feb. 24, 2011.

* cited by examiner

POLYMER USEFUL AS VISCOSITY INDEX IMPROVER

"This application is a 371 of PCT/EP2011/052710, filed 02/24/2011, which claims benefit of 61/327,917, filed 04/26/2010."

The present application relates to polymers useful as viscosity index improvers and to lubricant compositions comprising said polymers.

For more than 50 years, improvements in the temperature-viscosity properties of lubricating oils have been achieved via addition of relatively high molecular weight polymers. The automotive lubricant industry commonly measures these temperature-viscosity properties as the viscosity index (VI). Lubricants with higher values of VI have viscosities which change less with changes in temperature.

There are a number of factors which must be considered when selecting or developing a polymer for applications as a viscosity index improver (VII). The primary requirement is stability and solubility of the polymer in the target oil at varying concentrations and temperatures. It is further preferred that the polymer is soluble in a variety of liquids. For automotive lubricant applications, solubility can be related to the nature of the base oil.

Also well known and commonly understood is that the molecular weight of the additive polymer influences the value of VI. The higher the molecular weight the more effective the polymer becomes at increasing the VI. Increasing the VI in this manner is limited, because as the molecular weight of the polymer increases so does the tendency to degrade under shear stresses. A polymer's ability to withstand degradation via mechanical shear stress is referred to as the shear stability or permanent shear stability index (PSSI). It is very common for an application to have a specified shear stability limit.

Further increases in VI can be obtained through modification of the polymer composition. The effectiveness of a VII is closely related to interactions between the polymer and lubricant oil. The addition of comonomers which can affect these interactions can lead to improved or reduced performance of the VI.

The document JP 2008 031459 A discloses a polymer useful as viscosity index improver. The viscosity index improver consists of copolymer having weight average molecular weight of 5000-1000000 and containing essential monomer of $CH_2=C(R^1)-COO(A-O)_n-(CH_2)_p-CH(R^2)-R^3$; where $R^1$ is H or Me, $R^2$ and $R^3$ are independent $C_1-C_{16}$ linear alkyl or $C_3-C_{34}$ branched alkyl (≤16 of sequential methylene group, 18-36 of total carbon of $R^2$, $R^3$, and $(CH_2)_p$), A is $C_2-C_4$ alkylene, n and p are integers of 0-20 and 0-15, respectively. Similar viscosity index improvers are disclosed in JP 2008-024908 A, JP 2003-292938 A, US 2004/0077509 A1 and EP-A-2 009 074.

The known polymers show a good efficiency as viscosity index improvers. Accordingly, most of these polymers exhibit a satisfactory property profile. However, there is a permanent effort to improve the relationship of thickening action, viscosity index and shear stability in order to achieve a desired viscosity with minimum use of additive in lubricant oils over a wide temperature range without impairing this property through premature degradation of the polymers.

Furthermore, the polymers should be producible in a simple and inexpensive manner, and especially commercially available components should be used. In this context, they should be producible on the industrial scale without new plants or plants of complicated construction being required for this purpose.

These objects and also further objects which are not stated explicitly but are immediately derivable or discernible from the connections discussed herein by way of introduction are achieved by polymers having all features of claim 1. Appropriate modifications to the inventive polymers are protected in the claims referring back to claim 1. With regard to the lubricant composition, claim 20 provides a solution to the underlying problem.

The present invention accordingly provides a polymer useful as viscosity index improver comprising units derived from one or more ethylenically unsaturated ester compounds of formula (I)

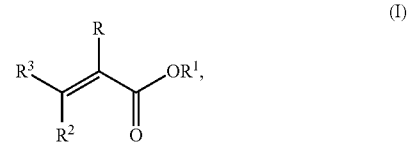

where R is hydrogen or methyl, $R^1$ means a linear, branched or cyclic alkyl residue with 1-6 carbon atoms, $R^2$ and $R^3$ independently represent hydrogen or a group of the formula —COOR', where R' means hydrogen or a alkyl group with 1-6 carbon atoms, units of one or more ethylenically unsaturated ester compounds of formula (II)

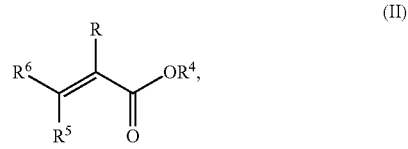

where R is hydrogen or methyl, $R^4$ means a 2-alkyl branched alkyl residue with 12-18 carbon atoms, $R^5$ and $R^6$ independently are hydrogen or a group of the formula —COOR", where R" means hydrogen or an alkyl group with 12-18 carbon atoms, and units of one or more ethylenically unsaturated ester compounds of formula (III)

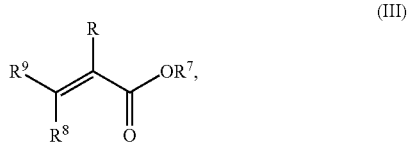

where R is hydrogen or methyl, $R^7$ means a linear alkyl residue with 12-24 carbon atoms, $R^8$ and $R^9$ independently are hydrogen or a group of the formula —COOR", where R" means hydrogen or an alkyl group with 12-24 carbon atoms, characterized in that said polymer comprises at least 10% by weight units derived from one or more ethylenically unsaturated ester compounds of formula (I), based on the total weight of the polymer, said polymer comprises at least 10% by weight units derived from one or more ethylenically unsaturated ester compounds of formula (II), based on the total weight of the polymer, and said polymer comprises at least 10% by weight units derived from one or more ethylenically unsaturated ester compounds of formula (III), based on the total weight of the polymer.

The present polymers provide a high efficiency as viscosity index improvers while retaining high shear stability. At the same time, the inventive polymers allow a series of further advantages to be achieved. These include:

The inventive polymers have a particularly high viscosity index-improving effectiveness in lubricant oils. These properties are achieved by low treating rates and high shear stabilities. The polymers of the present invention can be prepared in a particularly easy and simple manner. It is possible to use customary industrial scale plants. Furthermore, the present polymers impart fuel efficiency to vehicles using the inventive lubricants. In addition, hydraulic fluids comprising the present polymers show very low fuel consumption. Moreover, the present polymers have a high compatibility with very different base oils. This is especially true with regard to high performance base oils and GTL base oils.

Moreover, the present polymers show an astonishing low temperature performance.

The polymer according to the present invention comprises units derived from one or more ethylenically unsaturated ester compounds of formula (I)

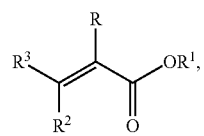

where R is hydrogen or methyl, $R^1$ means a linear, branched or cyclic alkyl residue with 1-6 carbon atoms, especially 1 to 5 and preferably 1 to 3 carbon atoms, $R^2$ and $R^3$ independently represent hydrogen or a group of the formula —COOR', where R' means hydrogen or a alkyl group with 1 to 6 carbon atoms.

Monomers according to formula (I) enclose (meth)acrylates, fumarates and maleates, with alkyl methacrylates having 1 to 5, especially 1 to 3 carbon atoms in the alkyl residue being preferred. The term methacrylates includes (meth)acrylates and acrylates as well as mixtures thereof. These monomers are well known in the art. The alkyl residue of the ester compounds can be linear, cyclic or branched.

Examples of monomers according to formula (I) are, among others, (meth)acrylates, fumarates and maleates, which derived from saturated alcohols such as methyl(meth)acrylate, ethyl(meth)acrylate, n-propyl(meth)acrylate, isopropyl(meth)acrylate, n-butyl(meth)acrylate, tert-butyl (meth)acrylate, pentyl(meth)acrylate and hexyl(meth)acrylate; cycloalkyl(meth)acrylates, like cyclopentyl(meth)acrylate and cyclohexyl(meth)acrylate. Preferably, the polymer comprises units being derived from methyl(meth)acrylate.

The polymer of the present invention comprises at least 10% by weight units derived from one or more ethylenically unsaturated ester compounds of formula (I), based on the total weight of the polymer. According to a preferred aspect of the present invention, the polymer preferably comprises about 15 to 85% by weight, more preferably about 25 to 45% by weight and most preferably about 32 to 40% by weight of units derived from monomers according to formula (I). Preferably, the polymer comprises at least 25% by weight and particularly at least 32% by weight of units being derived from methyl methacrylate.

The polymer may be obtained preferably by free-radical polymerization. Accordingly the weight fraction of the units of the polymer as mentioned in the present application is a result of the weight fractions of corresponding monomers that are used for preparing the inventive polymer.

In addition to the units derived from the monomers according to formula (I), the polymer of the present invention comprises units of one or more ethylenically unsaturated ester compounds of formula (II)

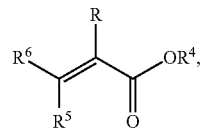

where R is hydrogen or methyl, $R^4$ means a 2-alkyl branched alkyl residue with 12-18 carbon atoms, $R^5$ and $R^6$ independently are hydrogen or a group of the formula —COOR", where R" means hydrogen or an alkyl group with 12-18 carbon atoms.

Examples of monomers according to formula (II) are, among others, (meth)acrylates, fumarates and maleates, which derived from saturated alcohols, such as 2-methylpentadecyl(meth)acrylate, 2-ethyltetradecyl(meth)acrylate, 2-propyltridecyl(meth)acrylate, 2-butyldodecyl(meth)acrylate, 2-methyl hexadecyl(meth)acrylate, 2-pentyldodecyl (meth)acrylate, 2-butylhexadecyl(meth)acrylate, 2-hexyldecyl(meth)acrylate or 2-hexylundecyl(meth)acrylate.

Especially preferred compounds include 2-hexyldecyl (meth)acrylate and 2-hexylundecyl(meth)acrylate.

Astonishing improvements could be achieved with polymers comprising a mixture of units derived from ethylenically unsaturated ester compounds of formula (II) and the mixture preferably comprises units having a 2-methyl branched alkyl residue as residue $R^4$ and units having a 2-ethyl branched alkyl residue as residue $R^4$.

According to a special aspect of the present invention the polymer may comprise a mixture of units derived from ethylenically unsaturated ester compounds of formula (II) and the mixture may particularly comprise units having a 2-propyl branched alkyl residue as residue $R^4$ and units having a 2-butyl or higher branched alkyl residue as residue $R^4$.

With further preference the polymer according to the present invention may comprise units of one or more ethylenically unsaturated ester compounds of formula (II) having a 2-methyl branched alkyl residue as residue $R^4$ and the units having a 2-methyl branched alkyl residue as residue $R^4$ may especially comprise at least 10% by weight, more preferably at least 20% by weight based on the units derived from ethylenically unsaturated ester compounds of formula (II).

Preferably, the polymer according to the present invention may comprise units of one or more ethylenically unsaturated ester compounds of formula (II) having a 2-ethyl branched alkyl residue as residue $R^4$ and the units having a 2-ethyl branched alkyl residue as residue $R^4$ may especially comprise at least 10% by weight, more preferably at least 20% by weight based on the units derived from ethylenically unsaturated ester compounds of formula (II).

Moreover, the polymer according to the present invention may comprise units of one or more ethylenically unsaturated ester compounds of formula (II) having a 2-propyl branched alkyl residue as residue $R^4$ and the units having a 2-propyl branched alkyl residue as residue $R^4$ may especially comprise at least 10% by weight, more preferably at least 20% by weight based on the units derived from ethylenically unsaturated ester compounds of formula (II).

Particularly, the polymer according to the present invention may comprise units of one or more ethylenically unsaturated ester compounds of formula (II) having a 2-butyl or higher branched alkyl residue as residue $R^4$ and the units having a 2-butyl or higher branched alkyl residue as residue $R^4$ may especially comprise at least 10% by weight, more preferably at least 20% by weight based on the units derived from ethylenically unsaturated ester compounds of formula (II).

According to a preferred embodiment of the present invention the units of one or more ethylenically unsaturated ester compounds of formula (II) comprise units having residues $R^4$ with 12 to 16 carbon atoms and the units having residues $R^4$ with 12 to 16 carbon atoms may preferably comprise at least 50% by weight, more preferably at least 70% by weight based on the units derived from ethylenically unsaturated ester compounds of formula (II).

The type of branching and the position of the branching can be determined via Nuclear magnetic resonance spectroscopy (NMR). Preferably, the monomers being used for preparing the polymers are employed and, if these monomers are a mixture, the mixture can be preferably separated before analyzing. Especially $^{13}C$- and $^1H$-NMR experiments may be performed and analysed. Useful information is provided in "Determination of the Oligomer Distribution in Ethoxylated Linear and Branched Alkanols using $^{13}C$-NMR", Li Yang et al. Eur. Polym, J. Vol. 33 (2), 143 (1997) and "Quantitative assessment of Alkyl Chain Branching in Alcohol-Based Surfactants by Nuclear Magnetic Resonance", J. Duynhoven, A. Leika and P. C. van der Hoeven, J. of Surfactants and Detergents Vol 8 (1), 73 (2005). Using the NMR method usually does not provide any distinction between butyl branching and pentyl-oder hexyl branching. Therefore, the expression 2-butyl or higher branched alkyl residue includes 2-pentyl and 2-hexyl branched residues.

The polymer of the present invention comprises at least 10% by weight units derived from one or more ethylenically unsaturated ester compounds of formula (II), based on the total weight of the polymer. According to a preferred aspect of the present invention, the polymer comprises preferably about 10 to 75% by weight, especially 20 to 55% by weight, more preferably about 25 to 45% by weight of units derived from monomers according to formula (II).

In addition to the units derived from the monomers according to formula (I) and (II), the polymer of the present invention comprises units of one or more ethylenically unsaturated ester compounds of formula (III)

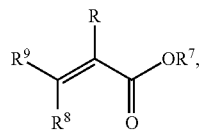

(III)

where R is hydrogen or methyl, $R^7$ means a linear alkyl residue with 12-24 carbon atoms, $R^8$ and $R^9$ independently are hydrogen or a group of the formula —COOR", where R" means hydrogen or an alkyl group with 12-24 carbon atoms.

Examples of monomers according to formula (III) are, among others, (meth)acrylates, fumarates and maleates which are derived from saturated alcohols, such as n-dodecyl(meth)acrylate, n-tetradecyl(meth)acrylate, n-pentadecyl (meth)acrylate, n-hexadecyl(meth)acrylate, n-octadecyl (meth)acrylate, n-eicosyl(meth)acrylate, n-docosyl(meth) acrylate or n-tetracosyl(meth)acrylate.

The polymer of the present invention comprises at least 10% by weight units derived from one or more ethylenically unsaturated ester compounds of formula (III), based on the total weight of the polymer. According to a preferred aspect of the present invention, the polymer comprises preferably about 10 to 75% by weight, especially about 20 to 40% by weight, more preferably about 25 to 35% by weight of units derived from monomers according to formula (III).

The ester compounds with a long-chain alcohol residue, especially monomers according to formula (II) and (III), can be obtained, for example, by reacting (meth)acrylates, fumarates, maleates and/or the corresponding acids with long chain fatty alcohols, where in general a mixture of esters such as (meth)acrylates with different long chain alcohol residues results. These fatty alcohols include, among others, Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Sasol); Epal® 610 and Epal® 810 (Ethyl Corporation); Linevol® 79, Linevol® 911 and Dobanol® 25L (Shell AG); Lial 125 (Sasol); Dehydad® and Dehydad® and Lorol® (Cognis).

Of the ethylenically unsaturated ester compounds, the (meth)acrylates are particularly preferred over the maleates and fumarates, i.e., $R^2$, $R^3$, $R^5$, $R^6$, $R^8$, $R^9$ of formulas (I), (II) and (III) represent hydrogen in particularly preferred embodiments.

According to a special aspect of the present invention, the weight ratio of the units derived from one or more ethylenically unsaturated ester compounds of formula (II) and the units derived from one or more ethylenically unsaturated ester compounds of formula (III) is preferably in the range of 8:1 to 1:8, especially in the range of 4:1 to 1:4, and more preferably in the range of 2:1 to 1:2.

The proportion of the units of formula (II) and formula (III) including the amount of the carbon atom number and the amount of branching can be determined by conventional methods, especially using the ethylenically unsaturated ester compounds of formula (II) and formula (III), respectively. These methods include gas chromatography (GC) and NMR.

The polymer may contain units derived from comonomers as an optional component. The comonomers include, among others, ethylenically unsaturated ester compounds being different to the ethylenically unsaturated ester compounds of formula (I), (II) and (III).

These monomers embrace ethylenically unsaturated ester compounds of formula (IV)

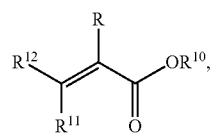

(IV)

where R is hydrogen or methyl, $R^{10}$ means a linear, branched or cyclic alkyl residue with 7-11 carbon atoms, $R^{11}$ and $R^{12}$ independently are hydrogen or a group of the formula —COOR", where R" means hydrogen or an alkyl group with 7-11 carbon atoms.

Among these are (meth)acrylates, fumarates and maleates derived from saturated alcohols, such as 2-ethylhexyl(meth)acrylate, heptyl(meth)acrylate, 2-tert-butylheptyl(meth)acrylate, n-octyl methacrylate, 3-isopropylheptyl(meth)acrylate, nonyl(meth)acrylate, decyl(meth)acrylate or undecyl(meth)acrylate;

cycloalkyl(meth)acrylates such as cyclohexyl(meth)acrylate having a ring substituent, such as tert-butylcyclohexyl(meth)acrylate and trimethylcyclohexyl(meth)acrylate, bornyl(meth)acrylate and isobornyl(meth)acrylate; and the corresponding fumarates and maleates.

Of the ethylenically unsaturated ester compounds, the (meth)acrylates are particularly preferred over the maleates and furmarates, i.e. $R^{11}$, $R^{12}$ of formula (IV) represent hydrogen in particularly preferred embodiments.

Furthermore, the polymer may contain units of one or more ethylenically unsaturated ester compounds of formula (V)

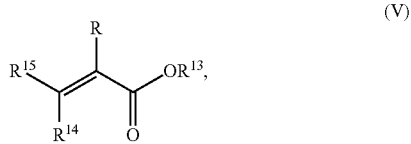

where R is hydrogen or methyl, $R^{13}$ means a 3-branched alkyl residue with 12-18 carbon atoms, $R^{14}$ and $R^{15}$ independently are hydrogen or a group of the formula —COOR", where R" means hydrogen or an alkyl group with 12-18 carbon atoms.

Examples of monomers according to formula (v) are, among others, (meth)acrylates, fumarates and maleates, which derived from saturated alcohols, such as 3-methylpentadecyl(meth)acrylate, 3-ethyltetradecyl(meth)acrylate, 3-propyltridecyl(meth)acrylate, 3-butyldodecyl(meth)acrylate, 3-methyl hexadecyl(meth)acrylate, 3-pentyldodecyl(meth)acrylate, 3-butylhexadecyl(meth)acrylate, 3-hexyldecyl(meth)acrylate or 3-hexylundecyl(meth)acrylate.

Of the ethylenically unsaturated ester compounds, the (meth)acrylates are particularly preferred over the maleates and furmarates, i.e. $R^{14}$, $R^{15}$ of formula (IV) represent hydrogen in particularly preferred embodiments.

Moreover, useful comonomers include hydroxyalkyl (meth)acrylates such as 3-hydroxypropyl(meth)acrylate, 3,4-dihydroxybutyl(meth)acrylate, 2-hydroxyethyl(meth)acrylate, 2-hydroxypropyl(meth)acrylate, 2,5-dimethyl-1,6-hexanediol(meth)acrylate, 1,10-decanediol(meth)acrylate;

aminoalkyl methacrylates and aminoalkyl methacrylamides like dimethylaminopropyl(meth)acrylamide, diethylaminopentyl(meth)acrylate, dibutylaminohexadecyl(meth)acrylate and morpholinoethyl(meth)acrylate;

nitriles of (meth)acrylic acid and other nitrogen-containing (meth)acrylates like N-(methacryloyloxyethyl)diisobutylketimine, N-(methacryloyloxyethyl)dihexadecylketimine, (meth)acryloylamidoacetonitrile, 2-methacryloyloxyethylmethylcyanamide, cyanomethyl(meth)acrylate;

acryl(meth)acrylates like benzyl(meth)acrylate or phenyl(meth)acrylate, where the acryl residue in each case can be unsubstituted or substituted up to four times;

carbonyl-containing (meth)acrylates like 2-carboxyethyl(meth)acrylate, carboxymethyl(meth)acrylate, oxazolidinylethyl(meth)acrylate, N-methyacryloyloxy)formamide, acetonyl(meth)acrylate, N-methacryloylmorpholine, N-methacryloyl-2-pyrrolidinone, N-(2-methyacryloxyoxyethyl)-2-pyrrolidinone, N-(3-methacryloyloxypropyl)-2-pyrrolidinone, N-(2-methyacryloyloxypentadecyl(-2-pyrrolidinone, N-(3-methacryloyloxyheptadecyl-2-pyrrolidinone; (meth)acrylates of ether alcohols like tetrahydrofurfuryl(meth)acrylate, vinyloxyethoxyethyl(meth)acrylate, methoxyethoxyethyl(meth)acrylate, 1-butoxypropyl(meth)acrylate, 1-methyl-(2-vinyloxy)ethyl(meth)acrylate, cyclohexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethoxymethyl(meth)acrylate, 2-ethoxyethyl(meth)acrylate, ethoxylated(meth)acrylates, allyloxymethyl(meth)acrylate, 1-ethoxybutyl(meth)acrylate, methoxymethyl(meth)acrylate, 1-ethoxyethyl(meth)acrylate, ethoxymethyl(meth)acrylate;

(meth)acrylates of halogenated alcohols like 2,3-dibromopropyl(meth)acrylate, 4-bromophenyl(meth)acrylate, 1,3-dichloro-2-propyl(meth)acrylate, 2-bromoethyl(meth)acrylate, 2-iodoethyl(meth)acrylate, chloromethyl(meth)acrylate;

oxiranyl(meth)acrylate like 2,3-epoxybutyl(meth)acrylate, 3,4-epoxybutyl(meth)acrylate, 10,11 epoxyundecyl(meth)acrylate, 2,3-epoxycyclohexyl(meth)acrylate, oxiranyl(meth)acrylates such as 10,11-epoxyhexadecyl(meth)acrylate, glycidyl(meth)acrylate;

phosphorus-, boron- and/or silicon-containing (meth)acrylates like 2-(dimethylphosphato)propyl(meth)acrylate, 2-(ethylphosphito)propyl(meth)acrylate, 2-dimethylphosphinomethyl(meth)acrylate, dimethylphosphonoethyl(meth)acrylate, diethylmethacryloyl phosphonate, dipropylmethacryloyl phosphate, 2-(dibutylphosphono)ethyl(meth)acrylate, 2,3-butylenemethacryloylethyl borate, methyldiethoxymethacryloylethoxysiliane, diethylphosphatoethyl(meth)acrylate;

sulfur-containing (meth)acrylates like ethylsulfinylethyl(meth)acrylate, 4-thiocyanatobutyl(meth)acrylate, ethylsulfonylethyl(meth)acrylate, thiocyanatomethyl(meth)acrylate, methylsulfinylmethyl(meth)acrylate, bis(methacryloyloxyethyl)sulfide;

heterocyclic(meth)acrylates like 2-(1-imidazolyl)ethyl(meth)acrylate, 2-(4-morpholinyl)ethyl(meth)acrylate and 1-(2-methacryloyloxyethyl)-2-pyrrolidone;

vinyl halides such as, for example, vinyl chloride, vinyl fluoride, vinylidene chloride and vinylidene fluoride;

vinyl esters like vinyl acetate;

vinyl monomers containing aromatic groups like styrene, substituted styrenes with an alkyl substituent in the side chain, such as α-methylstyrene and α-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes;

heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives such as maleic anhydride, methylmaleic anhydride, maleinimide, methylmaleinimide;

fumaric acid and fumaric acid derivatives such as, for example, mono- and diesters of fumaric acid.

Monomers that have dispersing functionality can also be used as comonomers. These monomers are well known in the art and contain usually hetero atoms such as oxygen and/or nitrogen. For example the previously mentioned hydroxyalkyl(meth)acrylates, aminoalkyl(meth)acrylates and aminoalkyl(meth)acrylamides, (meth)acrylates of ether alcohols, heterocyclic(meth)acrylates and heterocyclic vinyl compounds are considered as dispersing comononers.

The polymer according to the present invention may preferably comprise 0 to 70% by weight, especially 0.1 to 50% by weight, more preferably 1 to 20% by weight of units derived from comonomers.

Preferably, the polymer may comprise 0 to 20% by weight, more preferably 0 to 10% by weight of units derived from one or more ethylenically unsaturated ester compounds of formula (IV) based on the weight of the polymer.

According to a special aspect of the present invention the polymer may preferably comprise 0 to 20% by weight of units more preferably 0 to 10% by weight derived from one or more ethylenically unsaturated ester compounds of formula (V) based on the weight of the polymer.

According to a preferred embodiment, the polymer comprises units derived from one or more ethylenically unsaturated ester compounds being different to the ethylenically unsaturated ester compounds of formula (I), (II) and (III) as mentioned above. Preferably, the weight ratio of the units derived from one or more ethylenically unsaturated ester compounds of formula (I) and the units derived from one or more ethylenically unsaturated ester compounds being different to the ethylenically unsaturated ester compounds of formula (I), (II) and (III) may be situated in the range of 100:1 to 1:1, more preferably in the range of 20:1 to 2:1 and most preferably in the range of 15:1 to 4:1.

The polymers according to the present invention have a molecular weight in the range of 5,000 to 2,000,000 g/mol, preferably in the range of range of 20,000 g/mol to 200,000 and more preferably in the range of 50,000 to 100,000 g/mol. These values refer to the weight average molecular weight of the polymers.

Without intending any limitation by this, the polymers of the present invention exhibit a polydispersity, given by the ratio of the weight average molecular weight to the number average molecular weight Mw/Mn, in the range of 1 to 15, preferably 1.1 to 10, especially preferably 1.2 to 5. The polydispersity and the weight average molecular weight may be determined by gel permeation chromatography (GPC) using a polymethyl methacrylate standard.

The polymers can be obtained by polymerizing mixtures comprising the monomers described above by any known method. Conventional radical initiators can be used to perform a classic radical polymerization. These initiators are well known in the art. Examples for these radical initiators are azo initiators like 2,2'-azodiisobutyronitrile (AIBN), 2,2'-azobis(2-methylbutyronitrile) and 1,1 azobiscyclohexane carbonitrile; peroxide compounds, e.g. methyl ethyl ketone peroxide, acetyl acetone peroxide, dilauryl peroxide, tert.-butyl per-2-ethyl hexanoate, ketone peroxide, methyl isobutyl ketone peroxide, cyclohexanone peroxide, dibenzoyl peroxide, tert.-butyl perbenzoate, tert.-butyl peroxy isopropyl carbonate, 2,5-bis(2-ethylhexanoyl-peroxy)-2,5-dimethyl hexane, tert.-butyl peroxy 2-ethyl hexanoate, tert.-butyl peroxy-3,5,5-trimethyl hexanoate, dicumene peroxide, 1,1 bis(tert. butyl peroxy)cyclohexane, 1,1 bis(tert. butyl peroxy) 3,3,5-trimethyl cyclohexane, cumene hydroperoxide and tert.-butyl hydroperoxide.

Low molecular weight polymers, especially poly(meth)acrylates can be obtained by using chain transfer agents. This technology is ubiquitously known and practiced in the polymer industry and is described in Odian, Principles of Polymerization, 1991. Examples of chain transfer agents are sulfur containing compounds such as thiols, e.g. n- and t-dodecanethiol, 2-mercaptoethanol, and mercapto carboxylic acid esters, e.g. methyl-3-mercaptopropionate. Preferred chain transfer agents contain up to 20, especially up to 15 and more preferably up to 12 carbon atoms. Furthermore, chain transfer agents may contain at least 1, especially at least 2 oxygen atoms.

Furthermore, the low molecular weight polymers, especially poly(meth)acrylates can be obtained by using transition metal complexes, such as low spin cobalt complexes. These technologies are well known and for example described in USSR patent 940,487-A and by Heuts, et al., Macromolecules 1999, pp 2511-2519 and 3907-3912.

Furthermore, novel polymerization techniques such as ATRP (Atom Transfer Radical Polymerization) and or RAFT (Reversible Addition Fragmentation Chain Transfer) can be applied to obtain useful polymers derived from alkyl esters. These methods are well known. The ATRP reaction method is described, for example, by J-S. Wang, et al., J. Am. Chem. Soc., Vol. 117, pp. 5614-5615 (1995), and by Matyjaszewski, Macromolecules, Vol. 28, pp. 7901-7910 (1995). Moreover, the patent applications WO 96/30421, WO 97/47661, WO 97/18247, WO 98/40415 and WO 99/10387 disclose variations of the ATRP explained above to which reference is expressly made for purposes of the disclosure. The RAFT method is extensively presented in WO 98/01478, for example, to which reference is expressly made for purposes of the disclosure.

The polymerization can be carried out at normal pressure, reduced pressure or elevated pressure. The polymerization temperature is also not critical. However, in general it lies in the range of −20-200° C., preferably 0-130° C. and especially preferably 60-120° C., without any limitation intended by this.

The polymerization can be carried out with or without solvents. The term solvent is to be broadly understood here. Illustrative of suitable solvents are hydrocarbon solvents, for example, aromatic solvents (aromatic $C_{6-15}$ hydrocarbons, such as benzene, toluene, xylene, ethylbenzene, $C_{9-15}$ alkyl benzenes, trimethyl benzene, ethyl toluene and mixtures of them), mineral oils (such as paraffinic oils, naphthenic oils, solvent-refined oils, isoparaffin-containing high VI oils and hydrocracked high VI oils), and synthetic hydrocarbon lubricants (such as poly-α-olefin synthetic lubricant); ketone solvents, such as butanone and methyl ethyl ketone; and ester solvents, including, fatty oils, and synthetic ester lubricants (for example, di-$C_{4-12}$ alkyl $C_{4-12}$ dicarboxylates, such as dioctyl sebacate and dioctyl adipate, polyol poly-$C_{4-12}$ alkanoates, such as pentaerythritol tetra-caproate; and tri-$C_{4-12}$ hydrocarbyl phosphates, such as tri-2-ethylhexyl phosphate, dibutyl phenyl phosphate, di-2-ethylhexyl phenyl phosphate, 2-ethylhexyl diphenyl phosphate and tricresyl phosphate).

According to a preferred embodiment, the polymer is obtainable by a polymerization in API Group I, Group II, Group III, Group IV or Group V oils.

The inventive polymer can preferably be used in a lubricant oil composition. A lubricant oil composition comprises at least one type of lubricant oil. The lubricant oils include especially mineral oils, synthetic oils and natural oils.

Preferably, the lubricant oil is based on mineral oil from API Group I, II, or III. According to a preferred embodiment of the present invention, a mineral oil containing at least 90% by weight saturates and at most about 0.03% sulfur measured by elemental analysis is used. Especially, API Group II or Group III oils are preferred.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air and also hydrogenation of bituminous or brown coal is likewise possible. Accordingly, mineral oils have, depending on their origin, different proportions of aromatic, cyclic, branched and linear hydrocarbons. In general, a distinction is drawn between paraffin-base, naphthenic and aromatic fractions in crude oils or mineral oils, in which the term paraffin-base fraction represents longer-chain or highly branched isoalkanes, and naphthenic fraction represents cyclo-alkanes.

Valuable information with regard to the analysis of mineral oils and a list of mineral oils which have a different composition can be found, for example, in Ullmann's Encyclopedia of Industrial Chemistry, 5th Edition on CD-ROM, 1997, under "lubricants and related products".

Synthetic oils are, among other substances, organic esters, for example diesters and polyesters, like carboxylic esters and phosphate esters; organic ethers like silicone oils, perfluoro-alkyl ethers and polyalkylene glycol; and synthetic hydrocarbons, especially polyolefins and Gas to liquids oils (GTL), among which preference is given to polyalphaolefins (PAO) and GTL oils. They are for the most part somewhat more expensive than the mineral oils, but they have advantages with regard to performance.

Especially polyalphaolefins (PAO) are preferred. These compounds are obtainable by polymerization of alkenes, especially alkenes having 3 to 12 carbon atoms, like propene, hexene-1, octene-1, and dodecene-1. Preferred PAOs have a number average molecular weight in the range of 200 to 10000 g/mol, more preferably 500 to 5000 g/mol. Furthermore, GTL oils are useful as base fluid. These synthetic oils are obtained by a special refinery process converting natural gas or other gaseous hydrocarbons into longer-chain hydrocarbons such as gasoline or diesel fuel.

Natural oils are animal or vegetable oils, for example neatsfoot oils or jojoba oils.

For an explanation reference is made to the 5 API classes of base oil types (API: American Petroleum Institute).

American Petroleum Institute (API) Base Oil Classifications

| Base stock Group | Viscosity Index | Sulfur (weight %) | Saturates (weight %) |
|---|---|---|---|
| Group I | 80-120 | >0.03 | <90 |
| Group II | 80-120 | <0.03 | >90 |
| Group III | >120 | <0.03 | >90 |
| Group IV all synthetic Polyalphaolefins (PAO) | >120 | <0.03 | >99 |
| Group V all not included in Groups I-IV, e.g. esters, polyalkylene glycols | >120 | <0.03 | |

Base oils preferably have a kinematic viscosity (hereinafter referred to as KV) of 1-15 mm$^2$/s, particularly 2-5 mm$^2$/s, at 100° C.

Base oils preferably have a VI of at least 80, particularly at least 100 and preferably at least 120. Especially, the VI of the base oil may be 180 or less, particularly 150 or less and more preferably 140 or less. Base oils preferably have a cloud point (defined in JIS K2269) of −5° C. or less, particularly −10° C. or less, more particularly −15° C. or less, in view of low-temperature viscosity behavior, with little wax deposition at low temperature.

These lubricant oils may also be used as mixtures and are in many cases commercially available. The concentration of the inventive polymer in the lubricant oil composition is preferably in the range from 0.5 to 40% by weight, more preferably in the range from 1 to 23% by weight, based on the total weight of the composition. The amount of base oil in the lubricant is usually at least 60% by weight, more preferably at least 75% by weight.

In addition to the aforementioned components, a lubricant oil composition may comprise further additives.

These additives include antioxidants, corrosion inhibitors, antifoams, antiwear components, dyes, dye stabilizers, detergents, pour point depressants and/or DI additives.

In addition, these additives encompass further viscosity index improvers, dispersing assistants and/or friction modifiers, which are more preferably based on a polyalkyl(meth) acrylate. These polyalkyl(meth)acrylates are different to the present polymers and are described especially in the prior art discussed by way of introduction, and these polymers may have dispersing monomers. Preferred polymers useful as viscosity improvers and methods for their preparation are disclosed in US 2003/0104955 filed Aug. 3, 2002 with the USPTO having the application Ser. No. 10/212,784 and JP 2008-031459 A filed Jun. 29, 2007 with the Japanese Patent Office having the application number JP 2007-172420, both of which are incorporated herein by reference.

Preferred lubricant oil compositions have a viscosity in the range from 10 to 120 mm$^2$/s, more preferably in the range from 22 to 100 mm$^2$/s measured at 40° C. according to ASTM D 445.

In a particular aspect of the present invention, preferred lubricant oil compositions have a viscosity index, determined to ASTM D 2270, in the range from 100 to 400, more preferably in the range from 150 to 350 and most preferably in the range from 200 to 300.

The present lubricant composition can be used, for example, as engine oils (oils used in engines such as an engine for means of transportation and engine for machine tools); gear oils; transmission lube oils, particularly automatic transmission fluid (ATF), such as stepped automatic transmission fluid and continuously variable transmission fluid (CVTF); and traction oils, shock-absorber oils, power steering oils, hydraulic oils and the like.

The invention will be illustrated in detail hereinafter with reference to examples, without any intention that this should impose a restriction. All amounts are displayed in weight percent unless otherwise stated.

EXAMPLES 1 TO 5

A 4-neck glass round bottom flask equipped with condenser and glass stirrer was initially charged with a 375 g of monomer(s), 2.8 g of n-DDM and 30 g of Calumet's Hydrocal 3145. The reaction mixture was heated to 110° C. and a free radical initiator solution of 0.94 g of t-butyl peroctoate and 60.0 g of Hydrocal 3145 was added to the flask over 165 minutes. 10% of this free radical initiator solution was added in the first 60 minutes, followed by 20% in the next 60 minutes and the remainder in the final 45 minutes. The reaction mixture was held 60 minutes after complete addition of the initiator mixture and then diluted with Hydrocal 3145 to obtain the desired polymer concentration.

The compositions of monomer mixtures according to the Examples are shown in table 1.
List of Abbreviations:
MMA=methyl meth acrylate
L125MA=alkyl meth acrylate prepared from Sasol's LIAL 125; the alkyl residue is a mixture of linear and branched residues
(about 12 wt. % branched $C_{12}$; about 11.3 wt. % linear $C_{12}$;
about 17.3 wt. % branched $C_{13}$; about 13.5 wt. % linear $C_{13}$;
about 15.7 wt. % branched $C_{14}$; about 11.9 wt. % linear $C_{14}$;
about 9.8 wt. % branched $C_{15}$; about 6.2 wt. % linear $C_{15}$;
2-methyl branching about 14%, 2-ethyl branching about 10%, 2-propyl branching about 10%, 2-butyl and higher 2-alkyl branching about 17%, based on the total of the linear and branched residues)
L167MA=alkyl meth acrylate prepared from Sasol's LIAL 167; the alkyl residue is a mixture of linear and branched residues
(about 4.7 wt. % linear $C_{15}$;
about 39.5 wt. % branched $C_{16}$; about 22.3 wt. % linear $C_{16}$;
about 22.4 wt. % branched $C_{17}$; about 10.3 wt. % linear $C_{17}$)
I167MA=alkyl meth acrylate prepared from Sasol's ISALCHEM 167, the alkyl residue is a mixture of predominatly branched residues
(about 1.3 wt. % linear $C_{15}$;
about 60.7 wt. % branched $C_{16}$; about 1.4 wt. % linear $C_{16}$;
about 34.6 wt. % branched $C_{17}$)
A1618MA=stearyl meth acrylate prepared from Condea's Alfol 1618; the alkyl residue is a mixture of predominantly linear residues
(about 30 wt. % linear $C_{16}$; about 70 wt. % linear $C_{18}$)
The proportion of linear and branched alkyl residues had been determined via GC and GC and $^{13}$C- and $^{1}$H-NMR.

The C13-Spectra were taken at 30° C. using conventional pulse-sequences for quantitative determining of $^{13}$C peaks. To ensure quantitative accuracy, a relaxation delay of at least 10 sec between pulses had been used and pulse schemes had been applied in order to suppress Nuclear-Overhauser-Effects. At least 10000 scans had been taken to achieve an appropriate S/N-ratio.

The $^{13}$C-NMR-data sets were processed by using a line broadening of 3 Hz to improve the S/N-ratio. $^{13}$C-NMR-Signals were assigned using 2D-NMR experiments and $^{13}$C-shift increment calculations (e.g. software package MestreNova from MestreLab Research). The integrals of one of the following $^{13}$C-signal-area are used to calculate the isomer-distribution:

| Substructure | $^{13}$C-Chemical Shift |
|---|---|
| Unbranched n-alkanol | 62.93 ppm (C1) |
| 2-Methyl-1-alkanol: | 69.30 ppm (C1), 16.68 ppm (C1, side chain) |
| 2-Ethyl-1-alkanol | 65.23 ppm (C1), 42.12 ppm (C2) |
| 2-Propyl-1-alkanol | 20.10 ppm (C2, side chain), 40.43 ppm (C2) |
| 2-Butyl+*-1-alkanol | 65.61 ppm(C1) includes 2-Propyl(C1), |
| *Butyl and chains >C4 | 40.64 ppm (C2) |

The peak areas had been normalized by setting the sum of the averaged peak areas to 100% to get the distribution of the branched alkanols in percent. Due to the fact, that the chemical shift is sensitive to structural changes in the range of 4 bonds away from the observed nucleus. The results had been cross-validated by Proton-NMR. Especially the degree of branching had been checked by the ratio of the peak area of □-Methyls (0.88 ppm) to □-CH$_2$ (3.3-3.7 ppm).

| Substructure | $^{1}$H-Chemical Shift |
|---|---|
| Unbranched n-Alkanol | 3.61 ppm (2H, t) |
| 2-Methyl-1-alkanol | 3.37 ppm (1H, B-Part of the ABX-system) |
| All other branched alkanols | 3.50 ppm (2H, d) |

MMA had been obtained from Evonik Röhm GmbH. The long chain methacrylates had been obtained by transesterification of MMA with appropriate alcohols. For preparation of L125MA a mixture of alcohols had been used being available from Sasol North America Inc. under the trade name Lial 125 having an average molecular weight of 207 g/mol. For preparation of L167MA a mixture of alcohols had been used being available from Sasol North America Inc. under the trade name Lial 167 having an average molecular weight of 246 g/mol. For preparation of I167MA a mixture of alcohols had been used being available from Sasol North America Inc. under the trade name Isalchem 167 having an average molecular weight of 242 g/mol. For preparation of A1618MA a mixture of alcohols had been used being available from Condea under the trade name Alfol 1618 having an average molecular weight of 354 g/mol.

Moreover, the weight average molecular weights had been determined by GPC in tetrahydrofuran at 35° C. using a polymethyl(meth)acrylate calibration curve composed of a broad molecular weight standard. A combination of two Waters Styragel 5E columns was used.

TABLE 1

Viscosity index improver compositions which illustrate the inventive nature of the claims

| Example Number | Examples | | | | |
|---|---|---|---|---|---|
| | 1 | 2 | 3 | 4 | 5 |
| MMA | 20 | 35 | 30 | 35 | 25 |
| L125MA | — | — | — | — | 65 |
| A1618MA | — | — | 25 | 10 | 10 |
| L167MA | 80 | 65 | — | 55 | — |
| I167MA | — | — | 45 | — | — |
| Mw (×10$^4$) | 8.5 | 9.0 | 8.0 | 8.0 | 9.0 |

The polymers obtained according to Examples 1 to 5 had been evaluated in a lubricant oil composition. As base oil Group 3 oil having kinematic viscosity of 3.02 mm$^2$/s at 100° C. commercially available from SK Energy Co., Ltd. under the trade name Yubase 3 had been used. For the sake of comparability the lubricant oil compositions were adjusted to a KV 100 of about 6.8. The amount of viscosity index improver and the results obtained are shown in table 2.

The VI was determined according to ASTM D 2270. The kinematic viscosity at 100° C. (KV100) was determined according to ASTM D 445. The shear stability is displayed as percent kinematic viscosity at 100° C. loss and was determined via a 40 minute sonic shear according to ASTM D 2603.

TABLE 2

Performance of the viscosity index improvers (VII)

| | | | | Results | | |
|---|---|---|---|---|---|---|
| Exam- | VII | | | | Shear | |
| ple | Exp | Amt | KV100 | VI | Stability | BF-40C |
| Application | 6 | 1 | 21 | 6.8 | 241 | 9.1 | 5700 |
| Examples | 7 | 2 | 23 | 6.8 | 251 | 7.9 | 7300 |
| | 8 | 3 | 21 | 6.8 | 236 | 6.5 | 70000 |
| | 9 | 4 | 22 | 6.8 | 251 | 6.5 | 20300 |
| | 10 | 5 | 17 | 6.8 | 249 | 10.0 | 10200 |

The Examples clearly indicate that the polymers of the present invention provide excellent properties. These include a high viscosity index, a low treating rate, a high shear stability and exceptional low temperature performance.

The invention claimed is:
1. A polymer, comprising:
at least 10% by weight, based on a total weight of the polymer, of units derived from one or more ethylenically unsaturated ester compounds of formula (I):

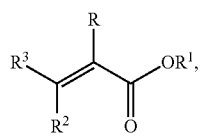

(I)

from 20 to 55% by weight, based on the total weight of the polymer, of units of one or more ethylenically unsaturated ester compounds of formula (II):

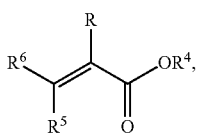

(II)

and
from 20 to 40% by weight, based on the total weight of the polymer, of units of one or more ethylenically unsaturated ester compounds of formula (III):

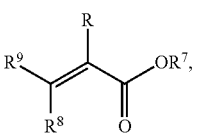

(III)

wherein R is hydrogen or methyl, $R^1$ is a linear, branched, or cyclic alkyl residue with from 1 to 6 carbon atoms,
$R^2$ and $R^3$ are hydrogen,
$R^4$ is a 2-alkyl branched alkyl residue with from 12 to 18 carbon atoms,
$R^5$ and $R^6$ are hydrogen,
$R^7$ is a linear alkyl residue with from 12 to 24 carbon atoms,
$R^8$ and $R^9$ are hydrogen,
wherein
units derived from ethylenically unsaturated ester compounds of formula (II) are a mixture, and
the mixture comprises as $R^4$:
units having a 2-methyl branched alkyl residue, and
units having a 2-ethyl branched alkyl residue, and/or
units having a 2-propyl branched alkyl residue, and
units having a 2-butyl or higher branched alkyl residue,
a weight ratio of total units of the one or more ethylenically unsaturated ester compounds of formula (II) to total units of the one or more ethylenically unsaturated ester compounds of formula (III) is from 4:1 to 1:1 and
the polymer is suitable as a viscosity index improver.

2. The polymer of claim 1, wherein polymer comprises from 25 to 45% by weight of units derived from one or more ethylenically unsaturated ester compounds of formula (I) based on the total weight of the polymer.

3. The polymer of claim 1, wherein the polymer comprises from 25 to 45% by weight of units of one or more ethylenically unsaturated ester compounds of formula (II) based on the total weight of the polymer.

4. The polymer of claim 1, wherein the polymer comprises from 25 to 35% by weight of units of one or more ethylenically unsaturated ester compounds of formula (III) based on the total weight of the polymer.

5. The polymer of claim 1, wherein the polymer has a weight average molecular weight of from 5,000 to 2,000,000 g/mol.

6. The polymer of claim 1, wherein the ethylenically unsaturated ester compounds of formula (II) comprises units having a 2-methyl branched alkyl residue as residue $R^4$ and units having a 2-ethyl branched alkyl residue as residue $R^4$.

7. The polymer of claim 1, wherein the ethylenically unsaturated ester compounds of formula (II) comprises units having a 2-propyl branched alkyl residue as residue $R^4$ and units having a 2-butyl or higher branched alkyl residue as residue $R^4$.

8. The polymer of claim 1, wherein the ethylenically unsaturated ester compounds of formula (II) comprise at least 10% by weight of units having a 2-methyl branched alkyl residue as residue $R^4$ based on the units of one or more ethylenically unsaturated ester compounds of formula (II).

9. The polymer of claim 1, wherein the ethylenically unsaturated ester compounds of formula (II) comprise at least 10% by weight of units having a 2-ethyl branched alkyl residue as residue $R^4$ based on the units of one or more ethylenically unsaturated ester compounds of formula (II).

10. The polymer of claim 1, wherein the ethylenically unsaturated ester compounds of formula (II) comprise at least 10% by weight of units having a 2-propyl branched alkyl residue as residue $R^4$ based on the units of one or more ethylenically unsaturated ester compounds of formula (II).

11. The polymer of claim 1, wherein the ethylenically unsaturated ester compounds of formula (II) comprise at least 10% by weight of units having a 2-butyl or higher branched alkyl residue as residue $R^4$ based on the units of one or more ethylenically unsaturated ester compounds of formula (II).

12. The polymer of claim 1, wherein the ethylenically unsaturated ester compounds of formula (II) comprise at least 50% by weight of units having residues $R^4$ with from 12 to 16 carbon atoms based on the units of one or more ethylenically unsaturated ester compounds of formula (II).

13. The polymer of claim 1, wherein the polymer further comprises from 0.1 to 50% by weight of units derived from comonomers.

14. The polymer of claim 1, further comprising:
a unit derived from an ethylenically unsaturated ester compound not of formula (I), (II), or (III).

15. The polymer of claim 14, wherein the unit derived from an ethylenically unsaturated ester compound not of formula (I), (II) or (III) is of formula (IV):

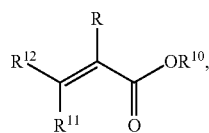

(IV)

wherein R is hydrogen or methyl,
$R^{10}$ is a linear, branched, or cyclic alkyl residue with from 7 to 11 carbon atoms, and
$R^{11}$ and $R^{12}$ are hydrogen.

16. The polymer of claim 15, wherein the polymer comprises from greater than 0 to 20% by weight of units of one or more ethylenically unsaturated ester compounds of formula (IV) based on the total weight of the polymer.

17. The polymer of claim 14, wherein the unit derived from an ethylenically unsaturated ester compound not of formula (I), (II) or (III) is of formula (V):

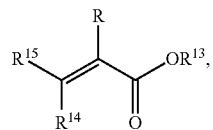

(V)

wherein R is hydrogen or methyl,
$R^{13}$ is a 3-branched alkyl residue with from 12 to 18 carbon atoms, and
$R^{14}$ and $R^{15}$ are hydrogen.

18. The polymer of claim 17, wherein the polymer comprises from greater than 0 to 20% by weight of units of one or more ethylenically unsaturated ester compounds of formula (V) based on the total weight of the polymer.

19. A lubricant composition comprising the polymer of claim 1.

20. The lubricant composition of claim 19, wherein a content of the poly er in the lubricant is from 0.5 to 40% by weight.

21. The lubricant composition of claim 19, wherein a base fluid content in the lubricant is at least 60% by weight.

22. A method of providing an automatic transmission fluid to an automatic transmission, comprising:
providing the lubricant composition of claim 19 as an automatic transmission fluid (ATF).

23. A method of improving a viscosity index of a lubricant oil, comprising adding the polymer of claim 1 to the lubricant oil in need thereof.

* * * * *